United States Patent [19]

Magg et al.

[11] 4,377,951
[45] Mar. 29, 1983

[54] GEAR-CHANGE MECHANISM FOR A GEAR-CHANGE TRANSMISSION CONSISTING OF A MAIN DRIVE AND A TWO-RANGE GROUP DRIVE

[75] Inventors: Alfred Magg; Peter Fischer, both of Friedrichshafen; Gerold Bieber, Langenargen, all of Fed. Rep. of Germany

[73] Assignee: Zahnradfabrik Friedrichshafen AG, Friedrichshafen, Fed. Rep. of Germany

[21] Appl. No.: 222,643

[22] Filed: Jan. 5, 1981

[30] Foreign Application Priority Data

Jan. 9, 1980 [DE] Fed. Rep. of Germany ....... 3000577

[51] Int. Cl.³ .............................................. G05G 5/10
[52] U.S. Cl. ........................................ 74/477; 74/475
[58] Field of Search .................................. 74/477, 475

[56] References Cited

U.S. PATENT DOCUMENTS 3,929,029  12/1975  Kelbel ................................... 74/477

FOREIGN PATENT DOCUMENTS

| 2746587 | 10/1977 | Fed. Rep. of Germany . |
| 2813099 | 3/1978 | Fed. Rep. of Germany . |
| 7802241 | 3/1978 | Fed. Rep. of Germany . |
| 1188598 | 2/1969 | United Kingdom . |
| 1408311 | 2/1973 | United Kingdom . |
| 1409228 | 4/1973 | United Kingdom . |
| 1525688 | 4/1977 | United Kingdom . |

*Primary Examiner*—Allan D. Herrmann
*Attorney, Agent, or Firm*—Karl F. Ross; Herbert Dubno

[57] ABSTRACT

A gear-change mechanism for a conventional two-range speed-selection transmission comprises a gearshift lever which is coupled to a shaft in a housing, this shaft carrying a pair of strikers which engage elements connected to the shifting rod. According to the invention, the striker forms a packet with a plurality of check plates disposed between and in front of and behind the striker plates and held on the shaft for axial displacement therewith. The check plates are guided in the housing so that they cannot rotate with the shaft.

4 Claims, 10 Drawing Figures

GEAR-CHANGE MECHANISM FOR A GEAR-CHANGE TRANSMISSION CONSISTING OF A MAIN DRIVE AND A TWO-RANGE GROUP DRIVE

FIELD OF THE INVENTION

The invention concerns a gear-change mechanism. More specifically, the invention relates to a gear-change transmission, consisting of a main drive and a two-range group drive, and comprising actuating means for transmitting the gear-shifting movements according to an HH gear-shift pattern for lever, the movements of which are transmitted to positively locking couplings of the main drive via gear-shifting means and two strikers non-rotatably connected with the main shaft, and further comprising means for operating the control valve for the range group and blocking means for blocking the non-selected gear trains and gears.

BACKGROUND OF THE INVENTION

Gear-change mechanisms of this kind have been disclosed in German patent document G 78 02 241 where parts of the gear-shifting means have been designed to perform several functions, so that despite the gear-changing operations of the basic drive which are basically the same for the higher as well as for the lower range, each gear of the gear-change transmission can be associated with a specific position of the hand gear-shift lever.

In general such drives are designed to have two ranges, for instance a 4-gear basic drive has altogether 8 forward gears in the two ranges of which in this case the gears 1 to 4 are in the lower range and the gears 5 to 8 are in the higher range, whereby the shifting of the 4 gears of the basic drive and therefore of one range is effected according to the usual H-type gear-shifting pattern. By employing for instance a second striker engaging in gear selector rods of the basic drive, the shifting of the 4 gears of the higher range can be effected according to an identical H-type gear-shifting pattern as the lower range, but laterally offset and adjacent to it, so that the pattern as a whole resembles a double "H" (HH pattern).

If the gear-change mechanism concerned comprises an independent change-over of the range group drive which is activated when the gear-shift lever changes over from one "H" pattern section to the neighboring one, then the gear-changing operations of such a group drive can be carried out with the same simplicity and logic as with a simple drive, but with 8 forward gears in 4 associated gear-chains. The reverse gear has its own gear chain which is used only in the lower range and which may include a crawler or very slow forward gear.

In order to limit the size of such gear-change mechanisms, but to ensure that the engaged gear can be safely recognized on the gear-shift lever, the space-oriented position is superimposed by power orientation. Due to the varying forces or force-free slot-in zones the operator receives additional clear information of the selected gear-chain so that the distances of the gear-chains can be reduced while simultaneously improving the orientation for the selected gear-chain. The spatial orientation which is still possible, further increases his confidence in having chosen the right gear and in any case allows him to differentiate between the gears within a gear-chain.

Despite the advantage of such a gear-change mechanism in the area of the driver's cabin, considerable space problems arise in the area of the gear-change housing in or on the gearbox and in the gearbox itself. The relatively many elements which such gearboxes require in order to be reliable and safe considering the many different adaptations to various vehicles, need space, which is often no longer available with different optimum vehicle designs.

OBJECT OF THE INVENTION

It is therefore the object of the invention to provide a gear-change mechanism which houses the necessary functions for reliable gear-shift operation including the blocking of gears in a minimum of space and which permits optimum adaptability, due to its small dimensions, to the gearbox and the vehicle.

SUMMARY OF THE INVENTION

This requirement is met in that check plates are arranged in axial direction on the main shaft in front of, between and behind the two strikers in such a way as to be non-rotatable in relation to the housing but movable together with the main shaft.

By arranging the strikers for gear-train selection and gear-shifting as well as the blocking means for the non-selected gear-trains on the main shaft itself, it is possible to omit the drag shaft which previously carried the blocking means, thus leading to a considerable reduction in installation space required in the radial direction. This advantageous arrangement facilitates the favourable accommodation, mostly in multiple-function, of further control and indicating elements and permits a favorable adaptation to manifold installations conditions.

According to a feature of the invention, one of the check plates cooperates in multiple-function with a ratchet housing which is firmly connected with the main shaft in aiding in slotting in the gear and the neutral position. This ratchet housing has means for operating the group drive and for blocking the neutral position. The check plates are held in the gear-change housing lid so as to be non-rotatable in relation to the main shaft but movable together with it. Preferably the check plates and strikers are arranged between a first holding plate and the ratchet housing which are secured to the main shaft. Furthermore, the first holding plate, the check plates and the strikers also have retaining means for the gear-trains according to the HH-gear-change pattern. The retaining means are widened and adapted so as to be suitable also for the reverse gear stop and the reverse gear switch. A second holding plate is for the axial support of the pressure spring on the main shaft and is adapted to also act as transmitter cam for the slot-in pin for gear-blocking when the secondary output is selected and for indicating the neutral position. The gear selector rods for operating the gear-shift mechanism in the basic drive are arranged at an angle of 45° when viewed in cross-section through the basic drive.

By arranging the check plates on the main shaft it is possible to use at least one of these check plates in multiple function to function as ratchet plate in cooperation with the ratchet housing. This leads to a saving in building components and to a reduction of the axial extent of the gear-change mechanism.

Fixing the check plates of the blocking device in the gear-change housing lid facilitates the assembly and provides a very simple and cost-saving solution.

Providing the axially fixed package consisting of check plates and strikers on the main shaft between a first holding plate and the ratchet body also forms in a particularly simple arrangement, the only thing to be borne in mind being that the strikers have to join not only in the axial movement of the check plates but also in the gear-shifting movement of the main shaft for changing gear.

The second holding plate for the axially arranged pressure spring also has a second function in radial direction thus aiding the axial shortening of the installation space without requiring additional installation space in radial direction, because this installation space is not available in the horizontal extent due to other necessary elements.

It is possible, due to the minimum space requirement of the gear-change mechanism on the gearbox—whereby of course the gear-change housing and the gearbox can be constructed in one piece—not only to adapt the mechanism to the vehicle without loss of installation space, but it is also possible to adapt it to different vehicles by using a further embodiment. By simply turning the followers on the gear selector rods through 90° the basic design of the gearbox can be adapted without alterations in the area of the selector rods to suit vehicles with horizontal or vertical main shafts.

Despite reducing the installation space for the gear-change mechanism to a minimum it still remains possible to provide transmitter elements for gear position indication in the driver's cabin, which can prove a great advantage for such a multi-gear drive—in particular then when the gearbox includes a splitting device.

BRIEF DESCRIPTION OF THE DRAWING

Further details in the invention will now be described with reference to the drawing in which.

SPECIFIC DESCRIPTION

Figure 1:
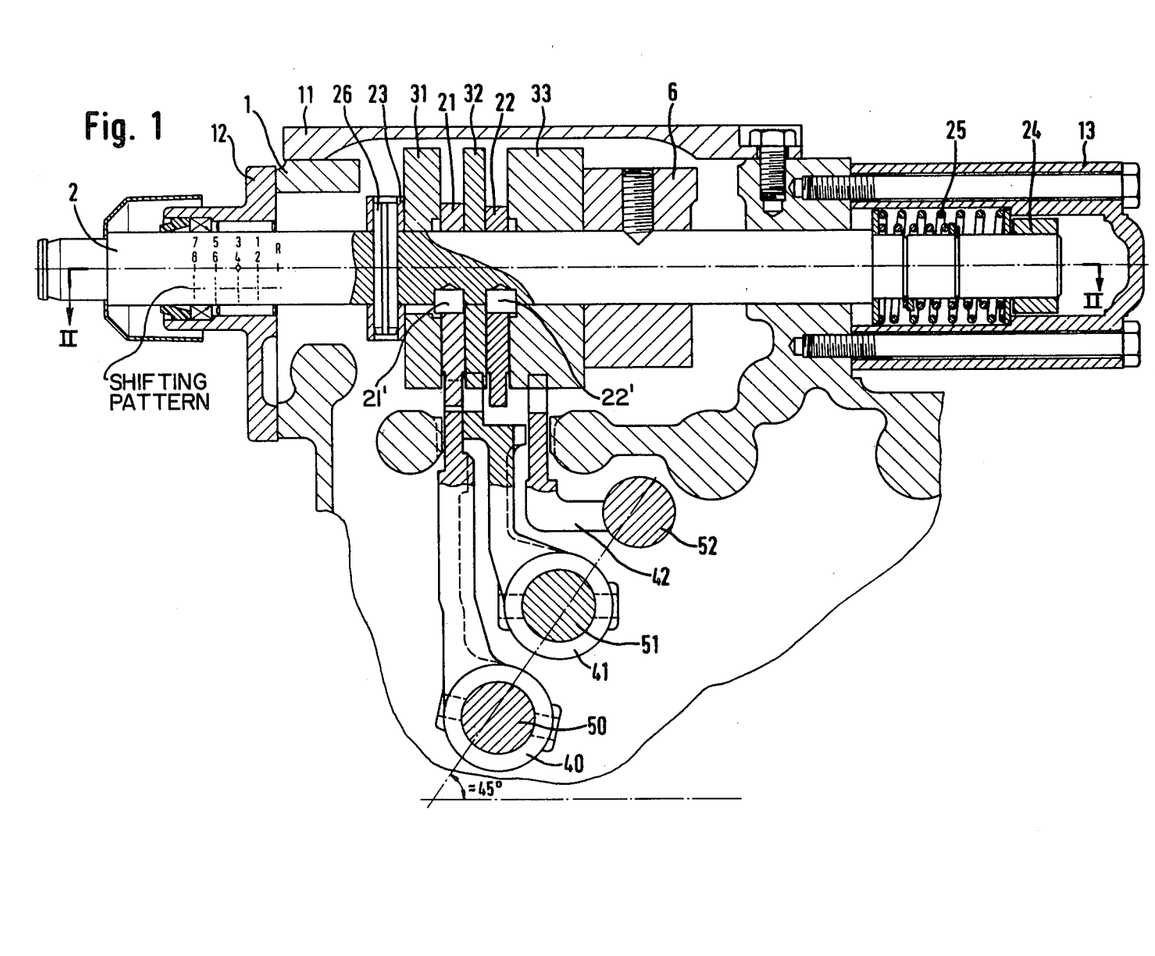
FIG. 1 is a section through the horizontal gearbox in the area of the gear-change mechanism.

FIG. 1 shows a main shaft 2 in a housing 1, which in this example comprises both the gearbox and the gear-change mechanism, with strikers 21, 22, check plates 31, 32, 33, a first holding plate 23 with holding pin 26, ratchet housing 6, a second holding plate 24 for axially supporting the pressure spring 25. The main shaft is supported in the flange 12 and in the housing 1 and the followers 40, 41, 42 are arranged between the gear selector rods 50, 51, 52.

Figures 2, 2A, 2B:
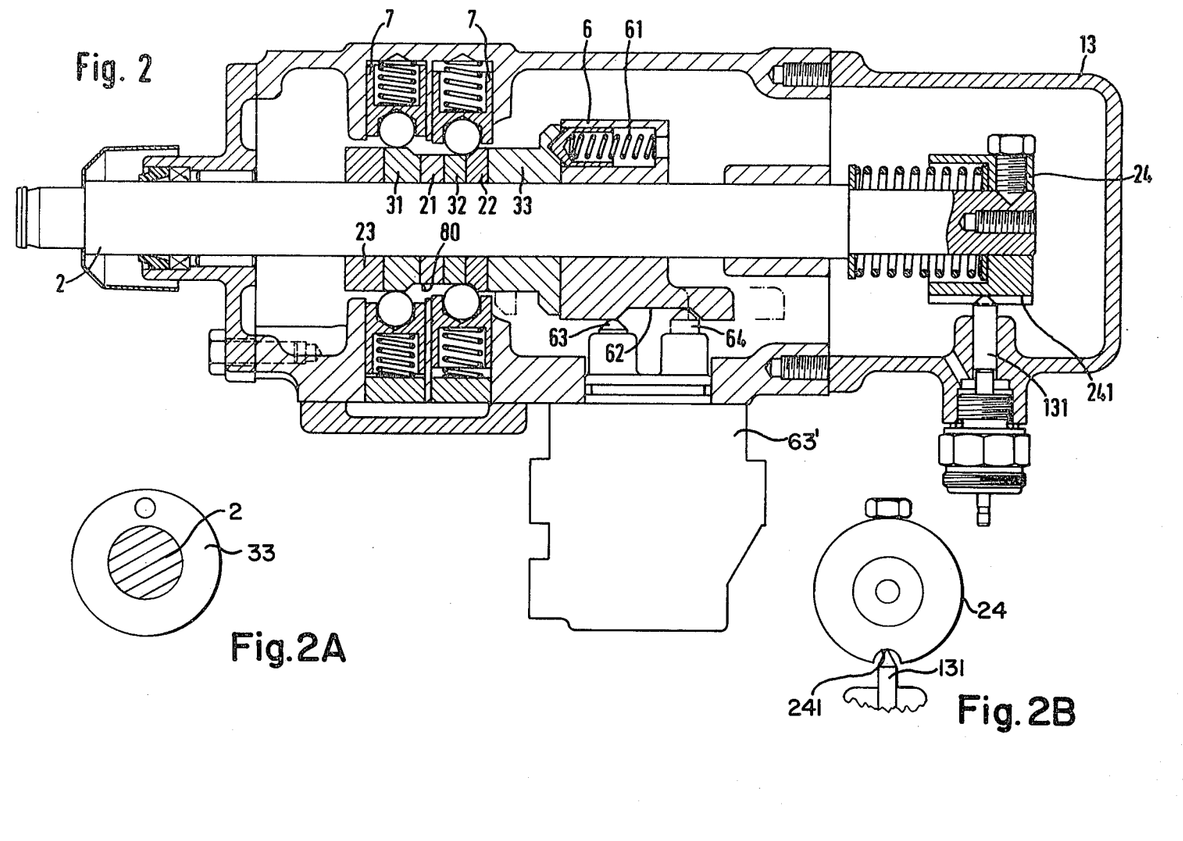
FIG. 2 is a section along II—II of FIG. 1.
FIGS. 2A and 2B are end views of elements of FIG. 2.

FIG. 2 is a section along the centre line of the main shaft 2, showing the spring-loaded ball elements 7 in conjunction with the control means 80 on the check plates 31, 32, 33 (see also FIG. 2A) and strikers 21, 22 (connected to the shaft by keys 21', 22') as well as the first holding plate 23 for slotting in the gear-trains; furthermore the gear-change retaining means 61 and the control cam 62 for operating the feelers 63, 64 connected with 3/2-way-valves for group change-over in the ratchet housing 6, and the second holding plate 24 with the transmitter cam 241 as well as the cover 13 for the main shaft 1 with slot-in pin 131 for blocking the gears and indicating the neutral position.

Figure 3:
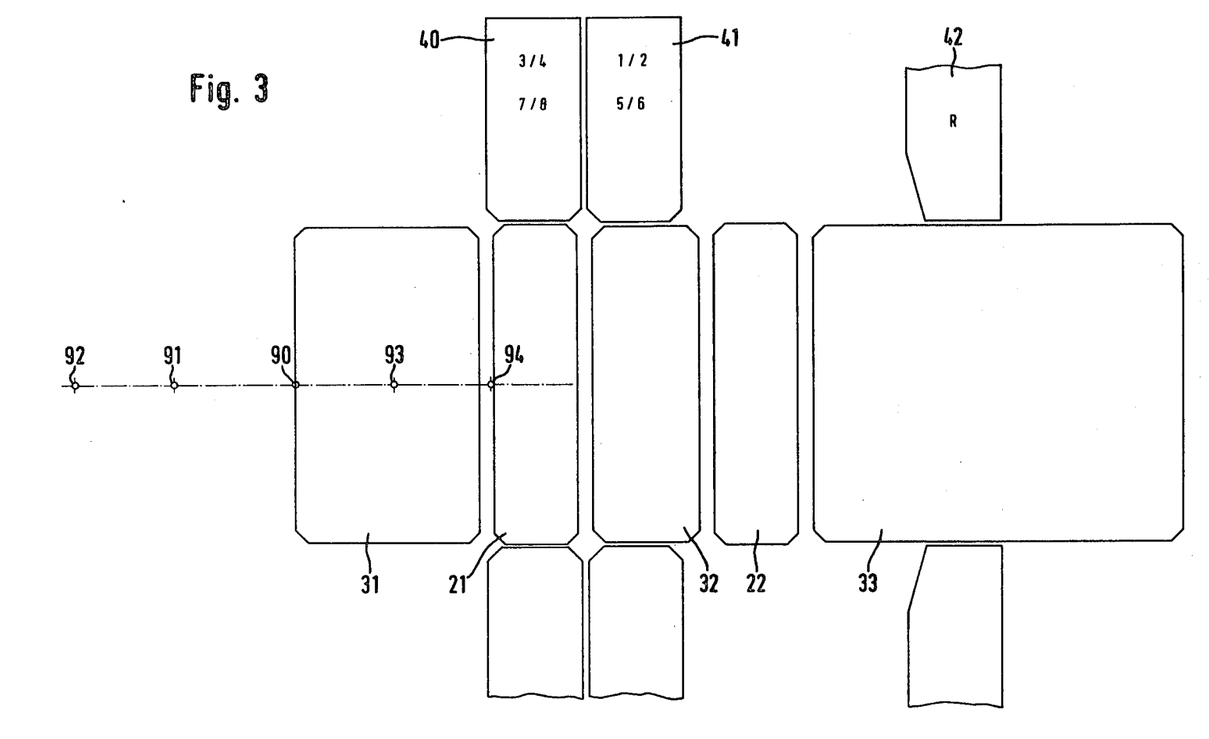
FIG. 3 is a schematic illustration for the gear-train selection of the main shaft.
Figure 4:
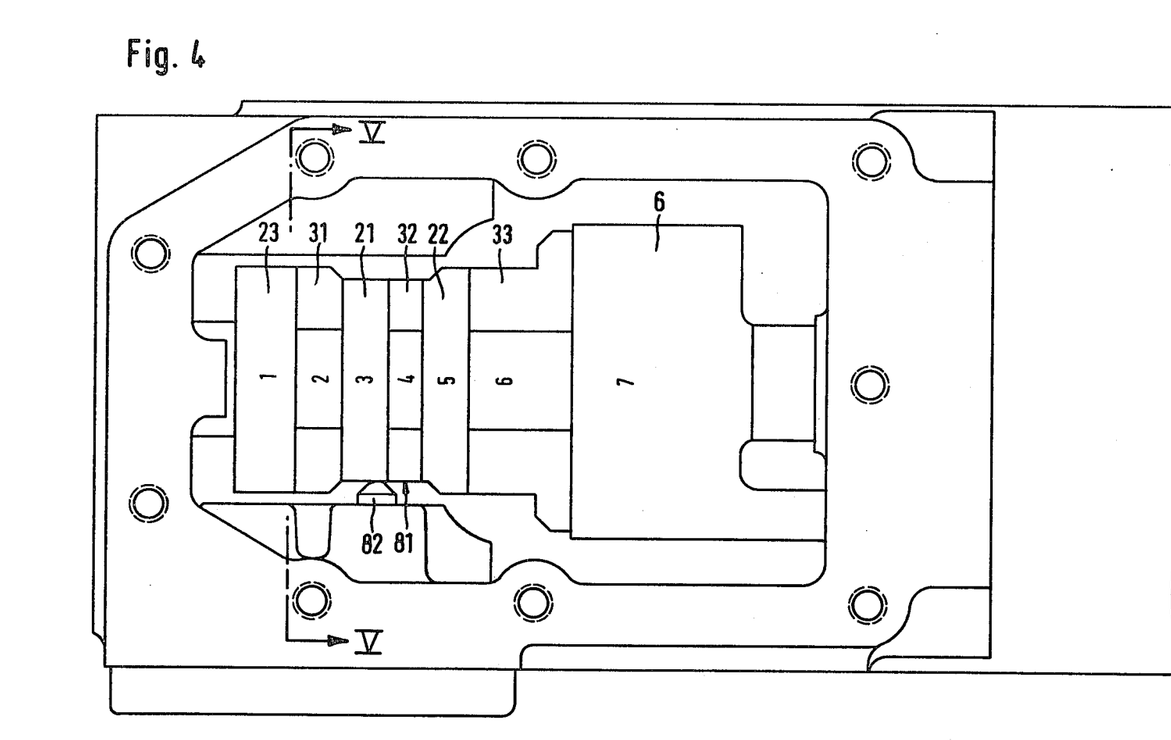
FIG. 4 is a plan view of the horizontal gearbox in the area of the gear-change-housing lid with the lid in the open position.
Figure 5:
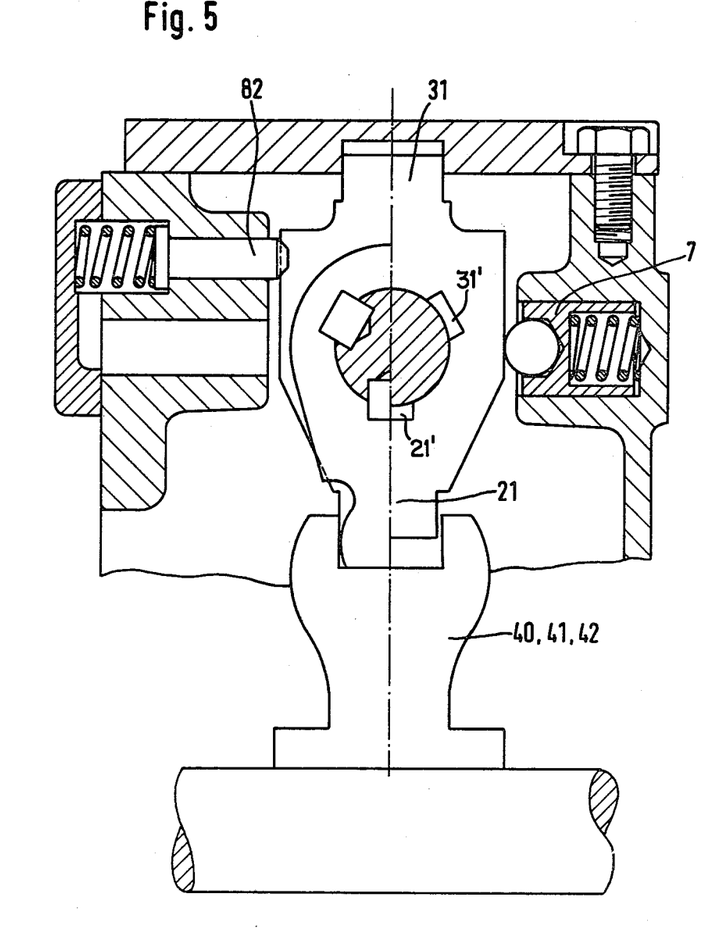
FIG. 5 is a section along V—V of FIG. 4.

FIG. 3 is a simple schematic illustration of the interaction between the strikers 21, 22 and the followers 40, 41, 42 on the associated selector rods 50, 51, 52 (FIG. 1) as well as of the blocking of the non-operated followers through check plates 31, 32, 33. FIGS. 4 and 5 show the control means 81 for the reverse gear with reverse gear stop 82 as well as the check plate 31 (with groove 31') in conjunction with the followers 40, 41, 42.

Figure 6:
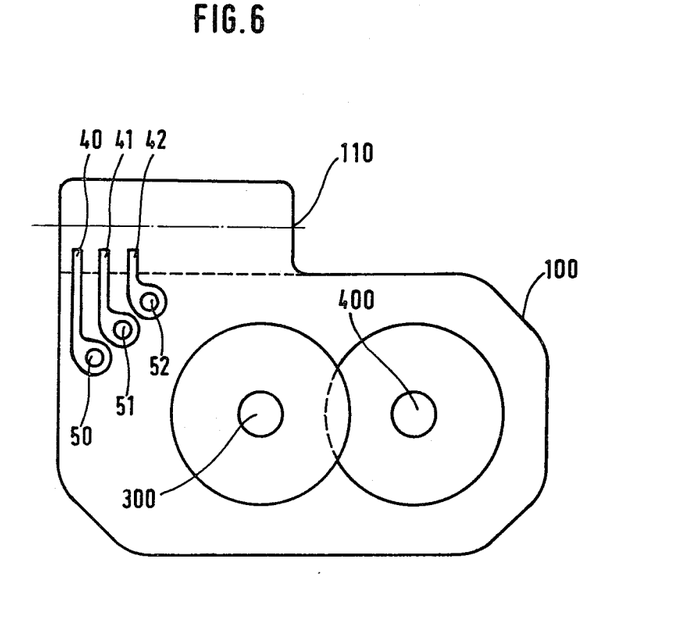
FIG. 6 is a section through the horizontal gearbox showing the arrangement of the gear selector rods and the gear-change housing.

FIG. 6 shows a possible position of the gear-change housing 1 or 110. It also shows one way of securing the followers 40, 41, 42 on the selector rods 50, 51, 52. The main shaft is designated 300 and the layshaft of the main drive 400.

Figure 7:
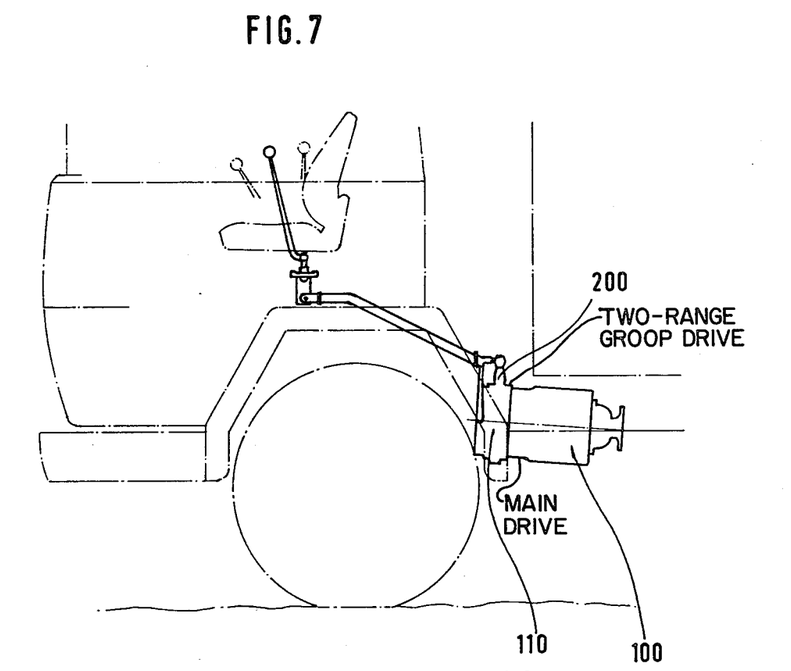
FIGS. 7 and 7A are schematic illustrations for fitting a gearbox into a vehicle.
Figure 7A:
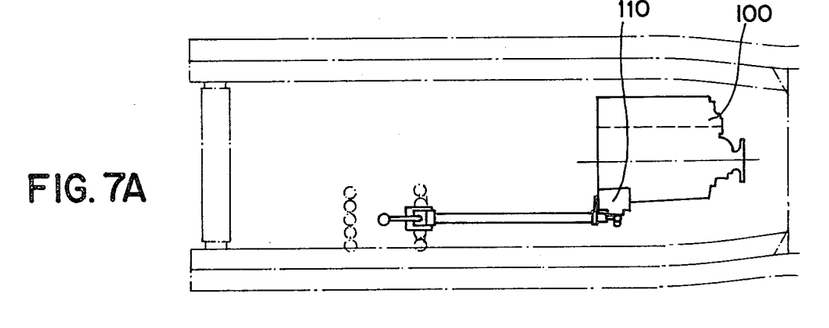

FIG. 7 shows a possible position of the gearbox 100 with a gear-change mechanism 110, whereby the main shaft 200 is arranged in a vertical position FIG. 7A is another view thereof.

The main shaft 2 (FIGS. 1, 2 and 3) is in the gear-train position 90 of the 3rd/4th gear, in which the striker 21 (FIG. 3) cooperates with the follower 40 of the selector rod 50, while the followers 41 and 42 are blocked by the check plates 32 and 33. The striker 22 which participates in the gear-changing movement—rotary movement—of the main shaft 2 is inoperative in this case. The feeler 63 for the lower range of the group drive engages the control cam 62 of the ratchet housing 6 and thus acts upon the 3/2-way-valve (63' not shown in detail) for the lower range. All other positions of a similar main shaft operate in the manner.

When selecting a gear within a gear-train, i.e. during rotation of the main shaft—the respective gear, e.g. the 3rd and 4th gear is arrested by means of the retaining means 61 provided in the ratchet housing 6 in conjunction with corresponding means provided in the check plate 33. The neutral position of the main shaft is located by the same means.

We claim:

1. A gear-change mechanism for a gear-change transmission having a plurality of gear-shifting rods, said mechanism comprising:
   a gear-change housing;
   a main shaft mounted in said housing so as to be angularly and axially displaceable therein;
   a gear-shift lever manually operated and connected to said shaft for displacement in a gear-shifting pattern to selectively actuate said rod;
   a pair of strikers mounted on said shaft and angularly displaceable therewith for selective engagement with elements connected to said rods for shifting gears upon displacement of said lever in said pattern; and
   a plurality of check plates nonrotatably connected to said housing but axially shiftable relative to said housing and carried by said shaft in front of, between, and behind said strikers for axial entrainment thereof with said shaft.

2. The gear-shift mechanism defined in claim 1 wherein one of said check plates is provided with a ratchet housing connected to said shaft for slotting in a respective gear selection and a neutral position of said shaft and said lever, said ratchet housing being provided with means for operating a multigear transmission and for blocking said neutral position.

3. The gear-change mechanism defined in claim 1 wherein a stack formed by said check plates with said strikers interdigitated therewith are mounted on said shaft between holding plates, a first of said holding plates, said check plates and said strikers having retaining means for restricting said patterns to a double-H gear-change pattern.

4. A mechanism defined in claim 3 wherein the other of said holding plates serves as a seat for a pressure spring on said shaft and as a transmitter cam for a mechanism for blocking positions other than a selected position of said shaft.

* * * * *